July 2, 1935.  J. B. HAWLEY  2,006,831
GLOBE AND METHOD OF AND MEANS FOR MAKING THE SAME
Filed June 10, 1932    7 Sheets-Sheet 1

Inventor:
Jesse B. Hawley
By: Wallace R. Lane
Atty.

July 2, 1935. J. B. HAWLEY 2,006,831
GLOBE AND METHOD OF AND MEANS FOR MAKING THE SAME
Filed June 10, 1932 7 Sheets-Sheet 2

Inventor:
Jesse B. Hawley
By: Wallace R. Lane.

July 2, 1935. J. B. HAWLEY 2,006,831
GLOBE AND METHOD OF AND MEANS FOR MAKING THE SAME
Filed June 10, 1932 7 Sheets-Sheet 3
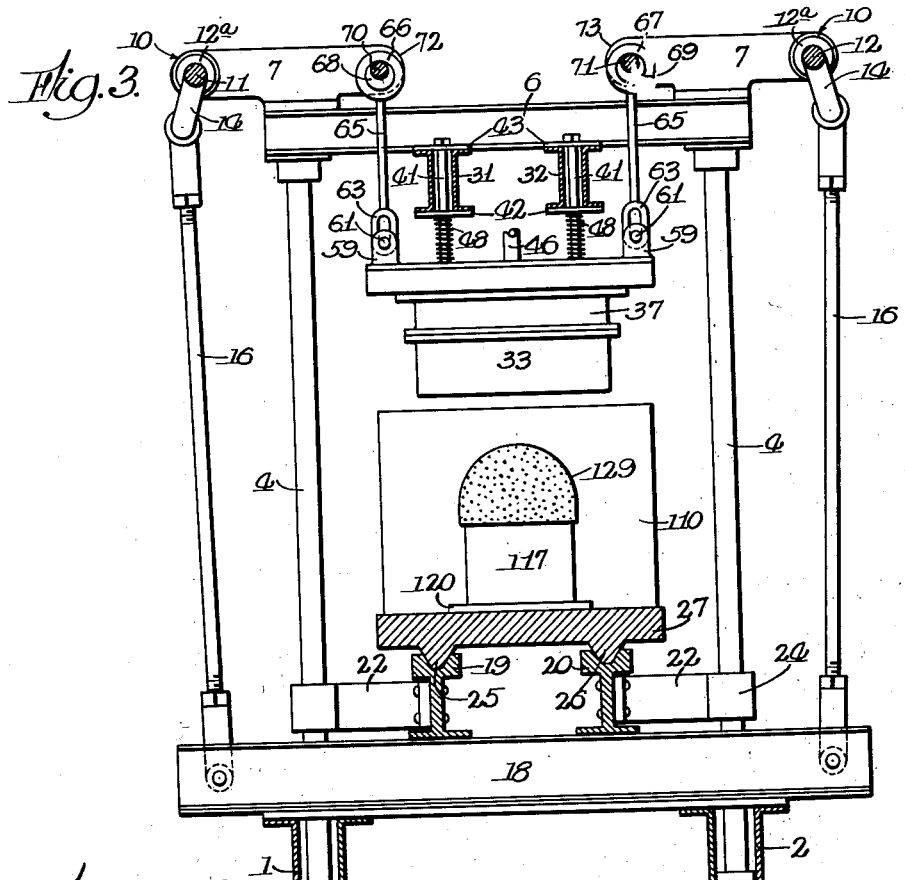
Inventor:
Jesse B. Hawley
By: Wallace R. Lane, Atty.

July 2, 1935.  J. B. HAWLEY  2,006,831
GLOBE AND METHOD OF AND MEANS FOR MAKING THE SAME
Filed June 10, 1932    7 Sheets-Sheet 4
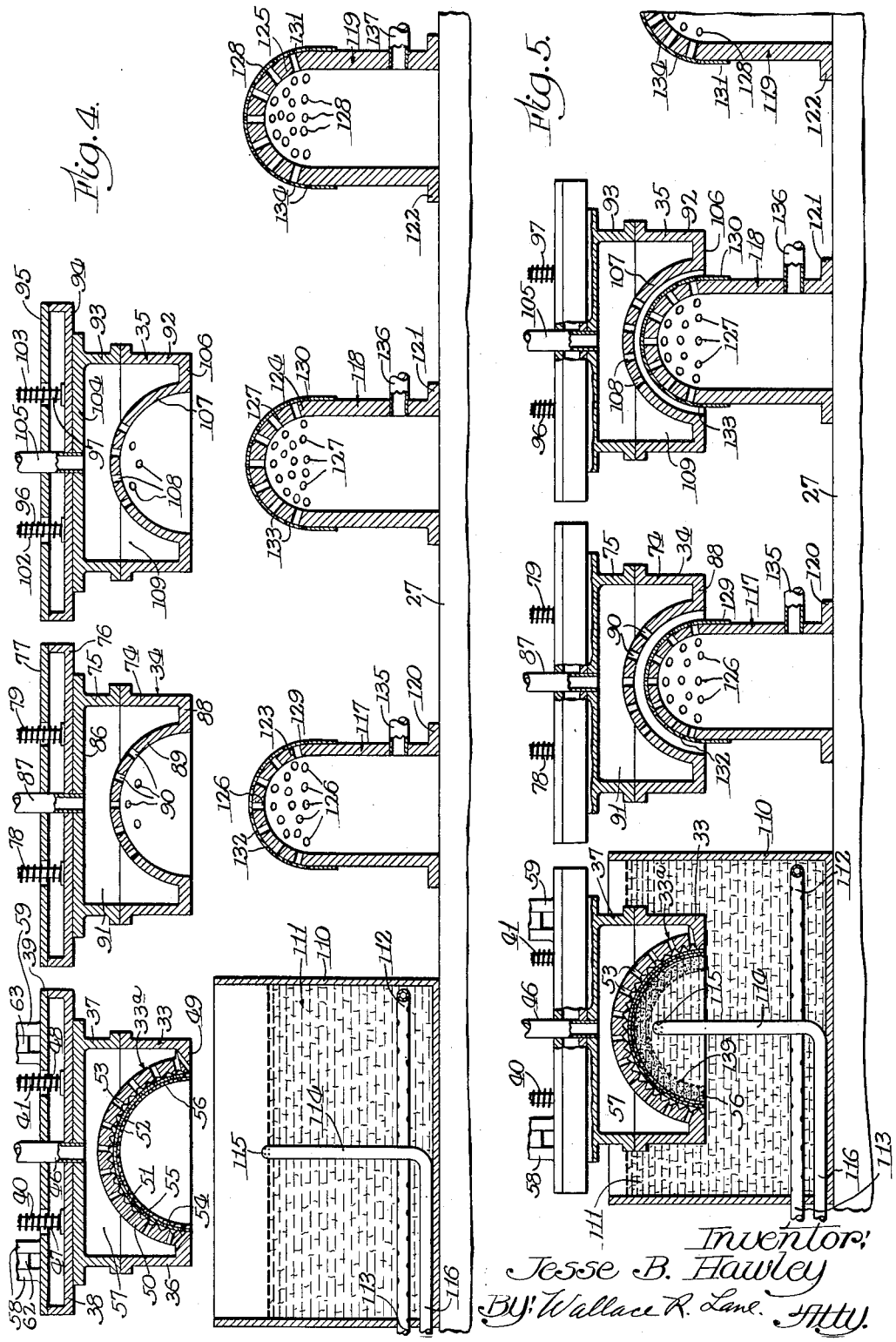
Inventor:
Jesse B. Hawley
By Wallace R. Lane. Atty.

July 2, 1935.  J. B. HAWLEY  2,006,831
GLOBE AND METHOD OF AND MEANS FOR MAKING THE SAME
Filed June 10, 1932   7 Sheets-Sheet 5
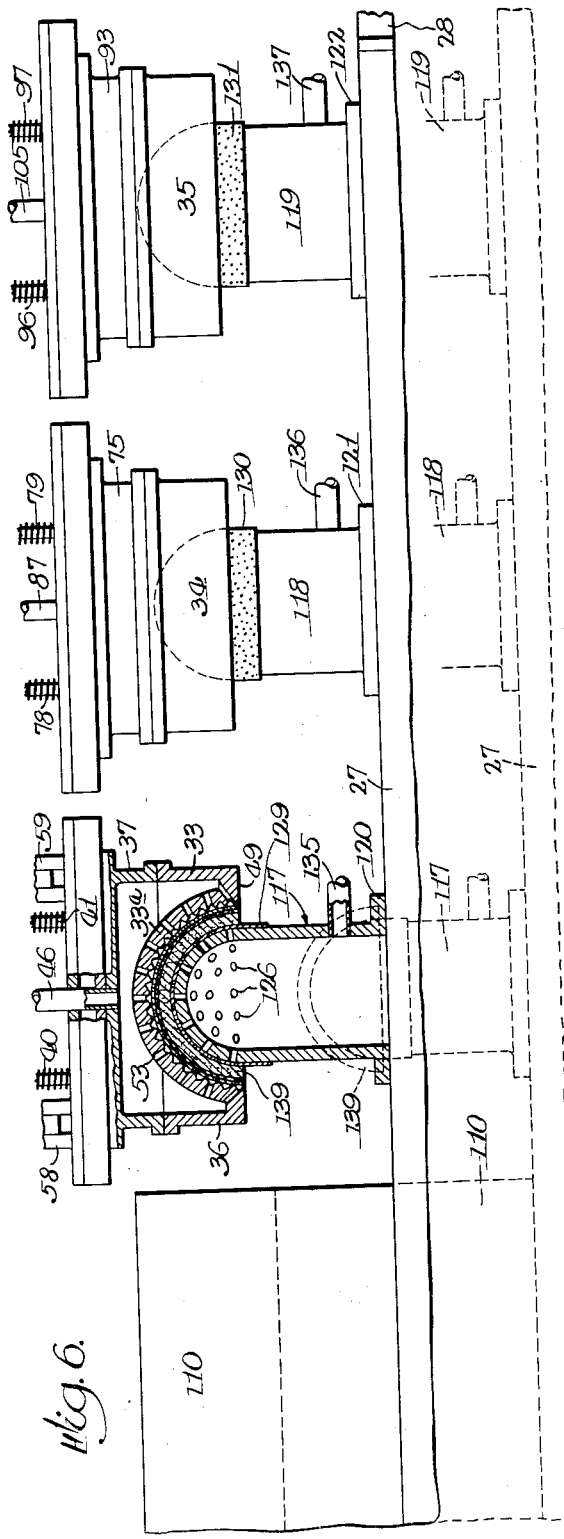
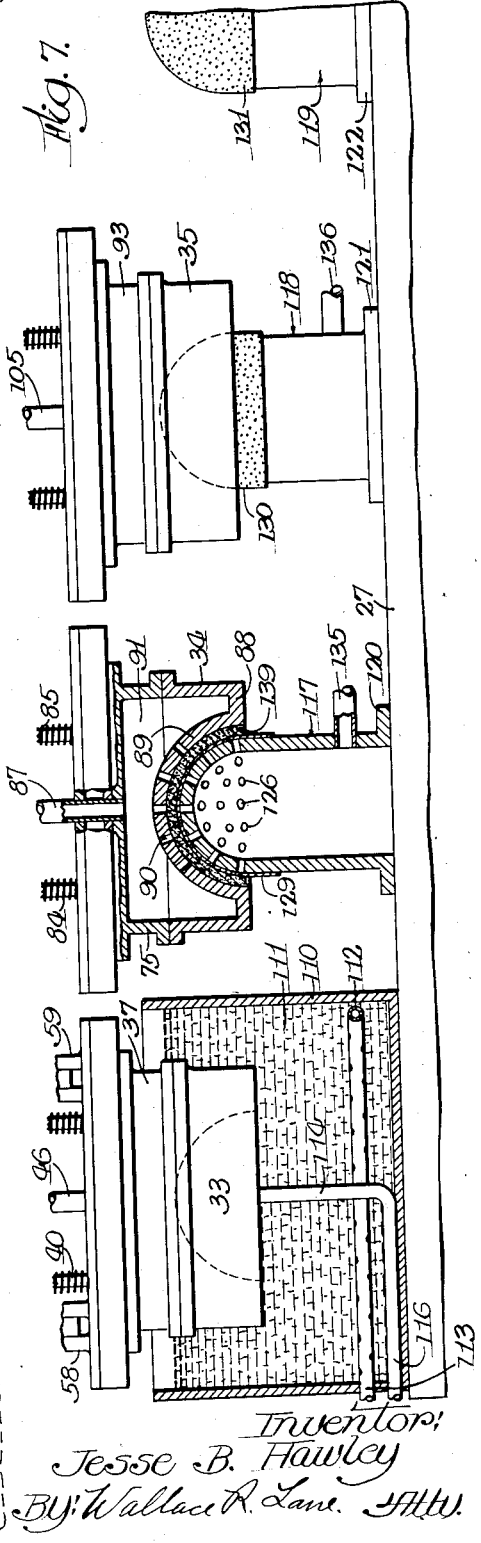
Inventor:
Jesse B. Hawley
By: Wallace R. Lane.

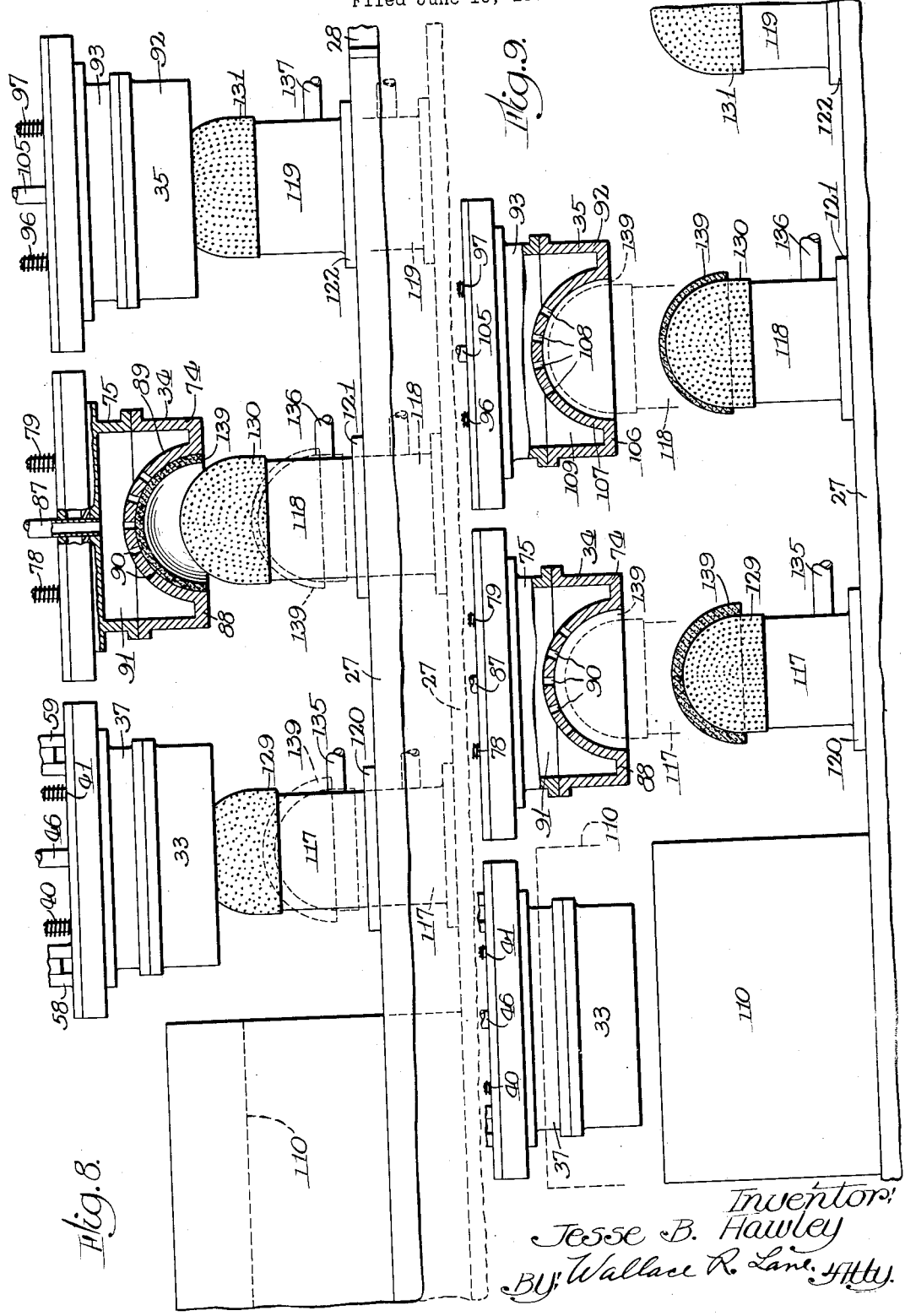

July 2, 1935.     J. B. HAWLEY     2,006,831
GLOBE AND METHOD OF AND MEANS FOR MAKING THE SAME
Filed June 10, 1932     7 Sheets-Sheet 7

Inventor:
Jesse B. Hawley
By: Wallace R. Lane.

Patented July 2, 1935

2,006,831

UNITED STATES PATENT OFFICE 2,006,831

GLOBE AND METHOD OF AND MEANS FOR MAKING THE SAME

Jesse B. Hawley, Geneva, Ill.

Application June 10, 1932, Serial No. 616,421

7 Claims. (Cl. 92—56)

The present invention relates to the making of globes, such as are used for geographical studies, whether terrestrial, celestial, or similarly.

Among the objects of the invention is to provide a novel globe initially formed in its desired globular shape by accretions and interlacings of fibrous material. The forming is preferably effected by the depositing of the fibrous material from a fluidal bath of the material, upon a porous contoured (spheric) former surface and under a differential of pressure on opposite sides of the surface of the former, and by the application of suitably contoured dies. The invention also comprehends novel forming and die means.

Globes, heretofore, have been made from various material and in various ways. In cases where it was desirous to make globes from paper-like material, it was usual to use the plastic papier-mâché method with a greater or less deforming of the initial sheets or laminae of plastic material to make them assume a more or less rounded form. Then when the material became dry, it was necessary to turn or work the surface by cutting, shaving, abrading and like operations to obtain a more or less spherical form. This made for a brittle, heavy, and expensive article. If the globe, so made, absorbed moisture, the globe warped or became distorted or deformed, because of the tendency of the material to return to its original pre-deformed shape, the material having been subjected to stresses and strains when it was deformed from its pre-deformed shape to impose upon it the desired globular form.

By the present invention the globe is made initially globular in form from fibrous material deposited by accretion and interlacing upon a spherical surface, so that the deposited material remains as initially formed without any stresses or strains being imposed upon the article in any stage, including its final stage of its composition. This makes for a very light weight, strong, stiff, accurate globe not subject to any distortion or warping under the influence of moisture or the like. It is not loaded with filling or sizing material. It is inexpensive to produce and may be made on a production basis with uniformity in shape, size, form and weight.

Preferably, the globe is composed of two hemispheres so joined together as to form a perfect sphere. Because of the method of forming the globe of accreted fibrous material, the surface of the globe may be initially formed integrally with lines either in cameo or intaglio to represent meridians, equatorial lines, tropical and arctical circles, and latitudinal and longitudinal lines and the like, and also contoured portions in relief or cameo to represent elevations, such as mountains, and in intaglio to represent depressions, such as rivers, river basins, seas, oceans, and the like.

Other objects, advantages, capabilities, features and process steps are comprehended by the invention as will later appear and as are inherently possessed by the invention.

Referring to the drawings:

Fig. 3 is a transverse sectional view taken in a plane represented by line 3—3 in Fig. 1 of the drawings;

Fig. 4 is a longitudinal sectional and schematic view of the machine showing a step in the art of making the globes;

Figs. 5, 6, 7, 8, 9, 10 and 11 are similar views of subsequent and successive stages of the operation of the machine and the art of making the globes;

Fig. 12 is a sectional view of a globe in the act of assembling and uniting the parts thereof;

Fig. 13 is a view of a completed globe prior to the applying of the map surface;

Fig. 14 is a fragmentary sectional view of the former for making a hemisphere with cameo lines or circles;

Fig. 15 is a similar view of a former for making a hemisphere with intaglio lines or circles; and, Fig. 16 is a similar view of a former for making a hemisphere with a contoured surface to represent mountains, rivers and the like.

Figure 1:
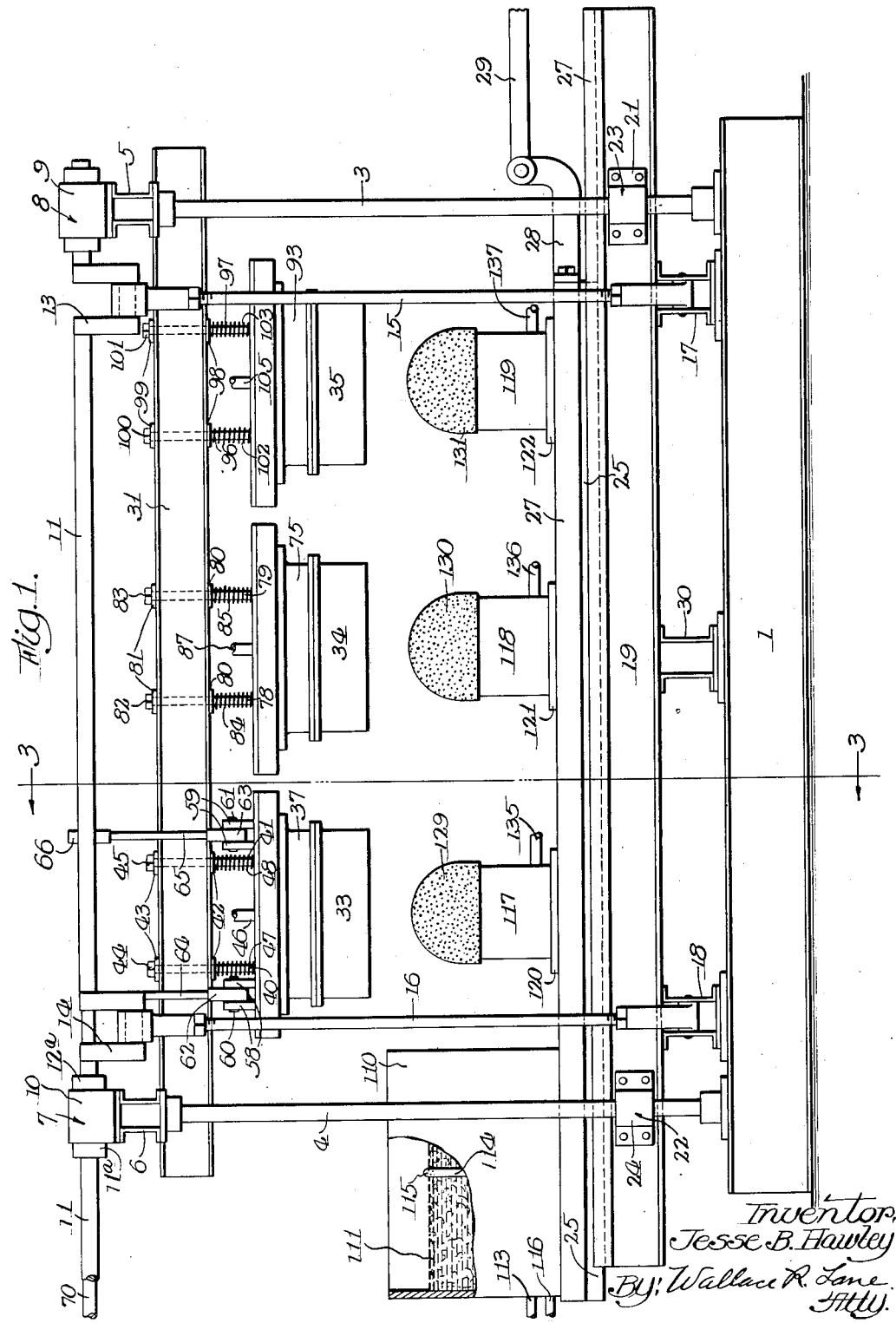
Fig. 1 is a view in elevation of a machine employed to practice the invention.

Referring more in detail to the drawings, the machine selected to practice the invention is shown as comprising base beams 1 and 2 (Figs. 1, 2 and 3) to which are secured standards or posts 3 and 4 to the upper ends of which are secured cross beams 5 and 6. Upon these beams 5 and 6 are secured brackets 7 and 8 provided with bearings 9 and 10 in which are rotatably supported shafts 11 and 12. Collars 11ª and 12ª secured to the shafts maintain the shafts against axial movement. These shafts are provided with cranks 13 and 14 to which are pivotally connected pitmen 15 and 16 pivotally connected at their lower ends to the end portions of cross beams 17 and 18. As the cranks 13 and 14 are rotated, the cross beams 17 and 18 are raised and lowered.

Supported upon beams 17 and 18 and secured thereto, are guide rails 19 and 20. To these rails are secured guide brackets 21 and 22 carrying guide sleeves 23 and 24 slidably embracing the standards 3 and 4. The rails 19 and 20 have longitudinal races or grooves in which slide tracks 25 and 26 of a table or platen 27. To an end of the table 27 is secured a bracket 28 to which is pivotally connected a connecting rod or pitman 29 adapted to reciprocate the platen 27 longitudinally. A cross beam 30 may be secured to the rails 19 and 20 to brace the same.

Beneath the cross beams 5 and 6 are secured longitudinal beams 31 and 32. From these beams 31 and 32 are hung or pendantly supported a former 33 and dies 34 and 35 (see Figs. 1 and 4).

The former 33 comprises a lower section 36, an upper section 37, and a top plate 38 having a cover 39, all of these parts being securely fastened together by any suitable means, as bolts (not shown) or even by welding or the like. To the top plate 38 are secured rods 40 and 41 at their lower ends, in any suitable manner, as by screwing, welding or the like. The rods extend upwardly through suitable apertures in the top plate 39 and through the beams 31 and 32, as also through apertured guide plates 42 and 43 secured, as by bolting, welding or the like, respectively to the bottom and top of the beams 31 and 32. The upper ends of the rods 40 and 41 are provided with heads 44 and 45 adapted to rest upon the guide plates 43 (see Figs. 1 and 3) when the former is in its lowermost position.

From the upper section 37 leads a suction pipe 46 suitably connected to a source of suction, the pipe being suitably secured in an aperture of the top wall of section 37 and passing through suitable apertures of the top plate 38 and cover 39 (see Fig. 4). Surrounding the rods 40 and 41 and interposed between the guide plates 42 and the top plate 38, are provided springs 47 and 48 which are compressed when the former is raised, as later explained.

The lower section 36 of the former 33, is formed with a bottom wall or floor 49 and a hemispherical wall 50 provided on its inner surface with ridges 51 and alternate grooves 52 leading to drain apertures 53. Upon the ridges is placed a hemispherical thin sheet 54, preferably metal, provided with a large number of small or fine apertures 55, and over this sheet 54, is located a hemispherical fine mesh reticulated sheet 56. As later more fully explained the water of the fibrous bath is drawn through the interstices of sheet 56, the apertures of sheet 54, the grooves 52, the apertures 53, into the chamber 57 of the former 33, and thence through the pipe 46.

During the molding and accreting of the fibrous material on the inner surface of the porous hemispherical part of the former, it is preferable to vibrate the former to assist the depositing of the fibres in a more or less interlaced condition upon the inner surface of the sheet 56. To that end the cover plate 39 has integrally formed therewith ears 58 and 59, carrying pintles 60 and 61 pivotally connected with links 62 and 63 of connecting rods 64 and 65. The upper ends of the rods 64 and 65 are formed with eccentric straps 66 and 67 embracing eccentrics 68 and 69 secured to shafts 70 and 71 rotatably supported in bearings 72 and 73 of the brackets 7 secured to the cross beams 5 and 6. (See Figs. 1 and 3.) It will be noted that the links 62 and 63 have elongated slots so that normally the pintles 60 and 61 rest in the lower ends of the slots or on the lower ends of the links, so that as the shafts 70 and 71 rotate with the eccentrics 68 and 69, the former 33 is vertically reciprocated or vibrated during the depositing and molding of the fibrous material upon the inner surface of the former sheet 56, but when the former 33 is raised, (later explained) the pintles 62 and 63 are idly located in the slots of the link, and the reciprocation of the rods 64 and 65 with the links 62 and 63, is idle or without effect on the former 33.

The die 34 comprises a lower section 74, an upper section 75, a top plate 76, and a cover plate 77, all rigidly secured together in any suitable manner as by bolting, welding or the like. Secured to the top plate 76 are rods 78 and 79 which extend upward through suitable apertures in the plate 77, through the beams 31 and 32, and apertured guide plates 80 and 81 secured to the bottom and top of the beams 31 and 32 (see Fig. 1), the upper ends of the rods 78 and 79 having heads 82 and 83 adapted to rest upon the top guide plates 81. (See Fig. 1.) Around the rods 78 and 79 and interposed between the guide plates 80 and the top plate 76, are springs 84 and 85 adapted to be compressed when the die 34 is raised, as later explained. The section 75 has an apertured top 86 to which is connected a suction or exhaust pipe 87 passing through suitable apertures provided in the top plate 76 and cover plate 77. The lower section 74 has a bottom wall 88 formed with a hemispherical die wall 89 having a few apertures 90 through which steam, vapors, moisture and air may be drawn into the chamber 91 of the die 34 and thence exhausted through the pipe 87, as later explained.

The die 35 is likewise constructed with a lower section 92, an upper section 93, a top plate 94, and a cover plate 95. To the cover plate 94 are secured rods 96 and 97 extending through suitable apertures provided in the cover plate 95, and upward through beams 31 and 32, and apertured guide plates 98 and 99 secured to the bottom and top of the beams 31 and 32, the upper ends of the rods 96 and 97 having heads 100 and 101 adapted to rest upon the guide plates 99. (See Fig. 1.) Interposed between the top plate 94 and the guide plates 98 and surrounding the rods 96 and 97, are springs 102 and 103 adapted to be compressed when the die 35 is raised, as later explained.

The upper section 93 has a top 104 suitably apertured for securement of a suction or exhaust pipe 105 extending through suitable apertures provided in the top plate 94 and the cover plate 95, to a source of suction or exhaust.

The lower section 92 has a bottom 106 having a hemispherical wall 107 provided with a few small apertures 108 through which steam, vapors, moisture, air and the like pass into the chamber 109 of the die 35, and thence through the suction or exhaust pipe 105.

The inner surface of the die wall 107 of die 35, is exactly hemispherical and of the size for the outer surface of the hemispherical globe half produced by the machine. The inner surface of die wall 89 of die 34, may be slightly larger and slightly greater in diameter at the mouth because of the greater thickness of the blank being operated on before it is transferred to die

35. Similarly the inner surface of the former sheet 56 may also be slightly larger because of the greater thickness of the blank formed thereon.

The former 33 and the dies 34 and 35 are designated as a female former, and female dies.

Upon the table or platen 27 are located in fixed relation, a vat or tank 110 adapted to contain a suitable amount of fibrous bath 111, such as pulp fibres in suspension in a body of water. The bath may be maintained in agitation by any suitable means, such as air blown through the apertures of a coil 112 having an air supply pipe 113. In the tank may also be located a release pipe 114 having apertures 115 at its upper end for supply of air under pressure to displace the bath portion in the female former at the time when the tank is lowered from the former, so as to prevent injuring the wet blank held on the sheet 56. The pipe 114 has an inlet or air supply pipe 116 extending to the exterior of the tank 110.

On the table 27 are also secured three male dies 117, 118 and 119 which are hollow and secured by base flanges 120, 121 and 122 by any suitable means, such as bolts, welding or the like. The upper ends of these dies are provided with hemispherical portions 123, 124 and 125 having apertures 126, 127 and 128. If desired, these portions may be provided with thin metal sheathings 129, 130 and 131 which are provided with a large number of fine apertures 132, 133 and 134. Pipes 135, 136 and 137 are also connected to these dies and to suitable apparatus (not shown) for creating a suction or a pressure in the dies. The die 117 operates with the former 33 and the female die 34; while the die 118 operates with the female dies 34 and 35; and the die 119 operates with female die 35, as later explained.

In the operation of the device, the table 27 and the parts carried thereon, are initially in the position or relation shown in Fig. 4. The rotation of the shafts 11 and 12 and the cranks 13 and 14, effect a raising of the table 27 and the tank 110 and the dies 117, 118 and 119 into the position or relation shown in Fig. 5. Suction is effected in the female former 33 so that the water of the bath is sucked or drawn through the hemispherical former part 33ª so as to cause a deposit or form a blank 139 of accreted and interlaced fibrous material on the inner surface of the sheet 56. This blank may be made of any thickness desired depending upon the length of time of immersion in the bath, the suction stress and the percentage of the fibrous material in the bath. Usually, the thickness may be from ⅛" to ¼". Compressed air is being supplied through the coil 112 to maintain the bath in agitation so that the fibres thereof will be evenly dispersed through the bath mass. There is no air being supplied through the pipe 114 at this time. At the same time, the shaft 70 is acting via eccentrics 68 and 69, rods 64 and 65, links 62 and 63 and the former, to vibrate or reciprocate the latter during the deposit and accretion of the fibres upon the sheet 56, so that there is a greater or more uniform distribution and interlacing of the fibres in the blank 139. If previous blanks have been formed, they are being compressed in the female dies 34 and 35 by the male dies 117 and 118, and a blank, if any, on die 119, is being blown off by air pressure in that die.

When the desired blank 139 has been accreted, interlaced and integrated in the former 33, the shafts 11 and 12 and the cranks 13 and 14 operate to lower the table 27 with the tank 110 and dies 117, 118 and 119 to the position shown in Fig. 4.

At this stage of the operation, as the tank 110 is being lowered, air under pressure is supplied through the pipe 114 so as to displace the body of bath held in the former portion 33ª, whereby as the bath surface leaves the lower end of the former 33, there will be no sudden drop of the water in the former portion 33ª and no tearing away of any of the blank 139. Suction is still being maintained in the former 33.

Figure 2:
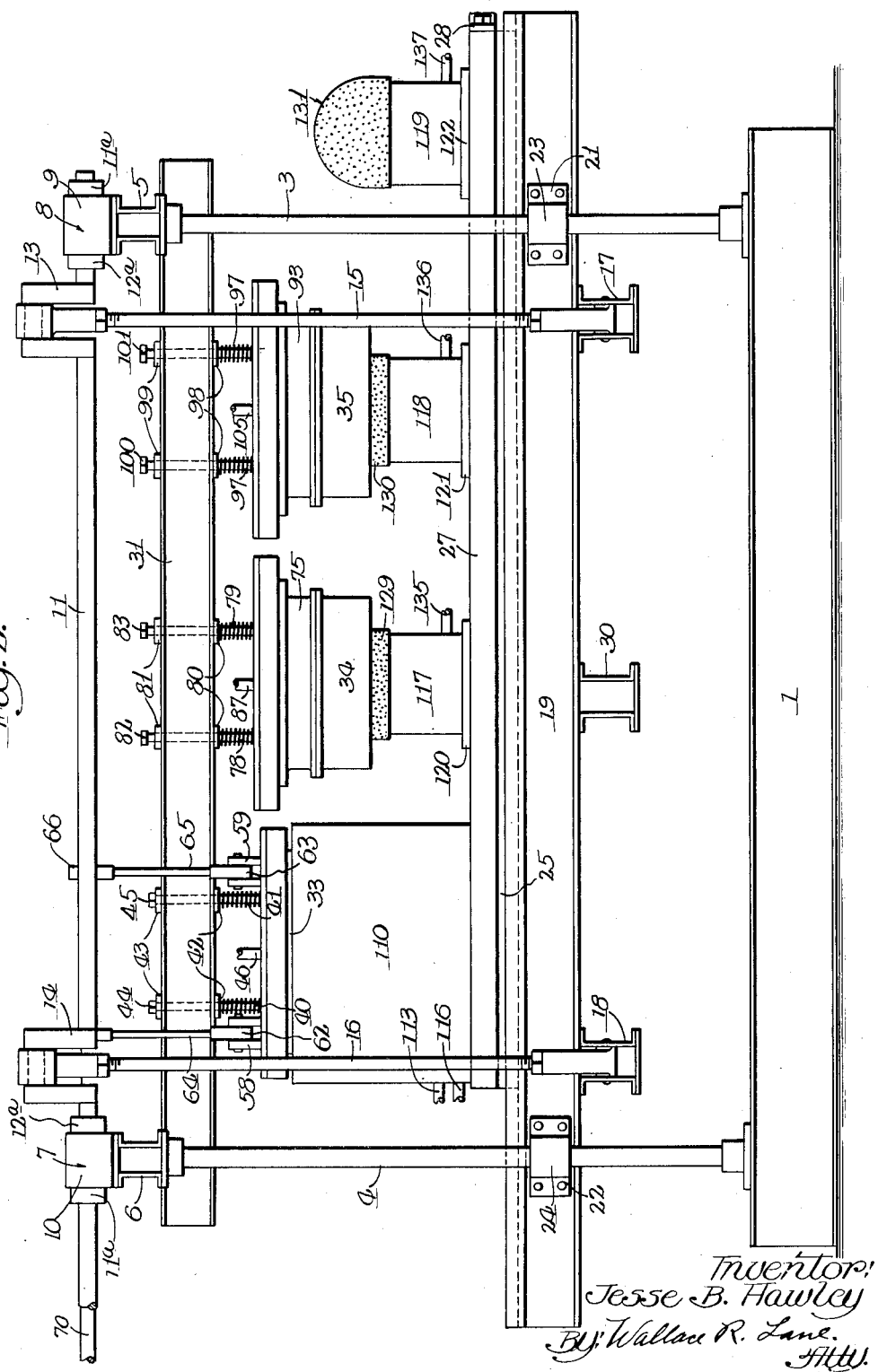
Fig. 2 is a similar view showing a phase of operation of the machine.

Then the pitman 29 operates to slide the table 27 and the means carried thereby, into the position or relation shown in Fig. 1, thus bringing the male dies 117, 118 and 119 under the former 33 and female dies 34 and 35 respectively. The female dies 34 and 35 are hot, usually having a temperature of from 300° to 400° F., such temperature being maintained by any suitable means (not shown).

The table 27 and the means thereon, are now raised by the cranks 13 and 14, into the position or relation shown in Fig. 6 of the drawings. The die 117 compresses the blank 139 and lifts the former 33 so that the links 62 and 63 operate idly, the former ceasing to reciprocate. The suction in the former 33 has been maintained up to this point in order to hold the blank to the former and to draw off the water squeezed out of the blank as the die 117 compresses it. Then a suction is effected in the die 117 and the suction in the die 33 either cut-off or reversed to a pressure, so that the blank may cling to the male die 117 as the latter is later lowered. See dotted line position in Fig. 6.

Any blanks which may have been transferred to the female dies 34 and 35, are compressed by the male dies 118 and 119.

When the table 27 has been lowered to the position shown in dotted lines in Fig. 6, it will be noted that the compressed and partly dried blank 139 now rests upon the male die 117, preparatory to being transferred to the female die 34.

The air that has been sucked or drawn through the blank when in the former 33 and later when on the die 117, effects a preliminary removal of included water thus to a certain extent effecting a drying of the blank. This may be termed "air drying".

The pitman 29 now moves the table 27 and the means thereon, to the right and into a position such as is shown in Fig. 4, but with the blank 139 now under the die 34.

The cranks 13 and 14 then operate to raise the table 27 into the position shown in Fig. 7, whereby the blank 139 is compressed against the hot die wall 89 of the die 34. Suction is effected in die 34 so that steam, vapors, moisture, and air (from die 117) pass through the apertures 90 into the die chamber 91 and thence via exhaust pipe 87. The blank 139 now clings to the wall 89. The die 117 acts to further compress the blank 139, the female die 34 being lifted against the compression of the springs 84 and 85. (See Fig. 2.) These springs are calibrated to determine the extent of the compression. At the same time another blank is being formed in the former 33, and a previous blank is being finally compressed in the die 35, and a finished blank is being blown off die 119.

The cranks 13 and 14 now operate to lower the table 27 into such a position as shown in Fig. 4 but with the blank 139 held in the female die 34.

See Figs. 7 and 8. Then the pitman 29 shifts the table to the dotted line position shown thereof in Fig. 8, whereby die 117 is brought under the former 33 and the dies 118 and 119 are brought under the female dies 34 and 35 respectively.

The cranks 13 and 14 then operate to raise the table 27. The full line showing of Fig. 8 is that of the table ascending. Die 118 now further compresses the blank 139 in the female die 34. The suction in die 34 is either cut-off or reversed to pressure, and a suction is effected in die 118, so that the blank will now cling to the die 118 preparatory to being transferred to die 35. At the same time the succeeding blank in former 33 is being compressed and the blank in die 35 is receiving its final compression and is being transferred by die 119 preparatory to being blown-off therefrom.

The cranks 13 and 14 now lower the table 27 to the dotted line position shown in Fig. 8, and then the pitman shifts the table 27 to the position shown in full lines in Fig. 9, wherein the blank 139 on die 118, is now under the finishing die 35. Then the cranks 13 and 14 raise the table 27 into the dotted line position shown (in part) in Fig. 9, whereby the blank 139 receives its finishing compression and drying, the suction in die 35 drawing off the residual steam, vapors, and moisture. The suction in die 118 is cut-off or reversed to pressure, and the blank 139 clings to the die wall 107 of die 35.

Figure 10:
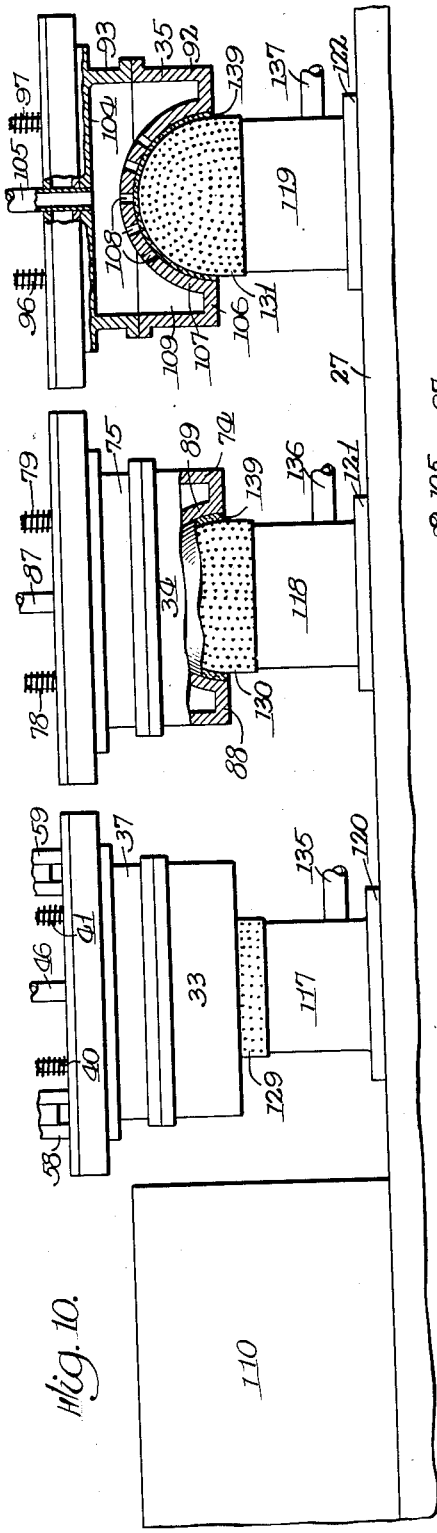

The table is then lowered (as full line position in Fig. 9) and then shifted to the left (as dotted line position in Fig. 8) and again raised as shown in Fig. 10. The male die 119 now engages the blank 139 in the die 35 for final compression. The suction in die 35 is now cut-off or reversed to pressure, and a suction is effected in the die 119 so that the blank 139 now clings to die 119.

Figure 11:
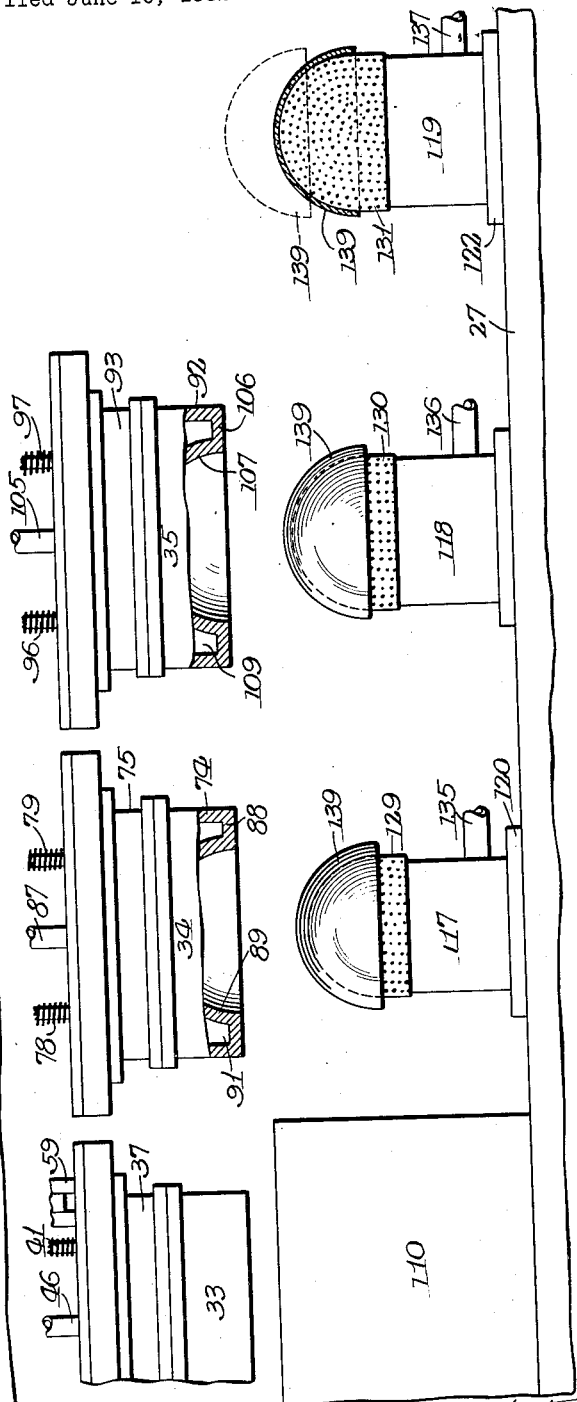

The table 27 is now lowered (as dotted line position in Fig. 9), and then shifted to the right as shown in Fig. 11. The finished blank 139 is shown in full lines on die 119, and in dotted lines above die 119, in Fig. 11, after it is blown-off by air pressure in the die 119.

The apertures 90 and 108 are differently located so that any protuberances formed on the blank in die 34, will be flattened or ironed out on the non-apertured surface portions of die 35.

All globe halves are exactly the same so that by the joining of any two halves, a perfect globe is effected. See Figs. 12 and 13.

To effect the globe shown in Fig. 13, an axis member 140 which may be a light weight tube, such as a wooden tube, or a paper tube, has attached to it paper or cardboard or similar discs 141 and 142 with an interposed paper, cardboard or like band 143 at the peripheries of the discs 141 and 142. See Fig. 12. The discs may be suitably secured at their peripheries to the edges of the band 143, as by gluing or the like. Likewise, the central apertured portions of the discs 141 and 142 may be suitably secured, as by gluing or the like, to collars 144 and 145 suitably attached at predetermined points to the axis member 140, as by gluing or the like or by cross pins 146 and 147.

Near the polar ends of the axis member 140 are located at predetermined points small paper, cardboard or like discs 148 and 149 suitably secured, as by gluing or the like, to collars 150 and 151 suitably secured to the axis member 140, as by gluing or the like, or by cross pins 152 and 153.

A globe half 154 having a polar aperture, is then located in place by passing the pole 155 of the member 140, through said aperture, and by sliding the equatorial rim 156 over the peripheral surface of the band 143 until the polar part 157 of the globe half 154, seats against the disc 149. The rim 156 will cover one half of the band 143 and coincide with the medial line of that band. A cross pin 158 may then be inserted in the pole 155 close to the globe polar part 157 to hold the globe half 154 in place. When this globe half is located in place, it is preferable to apply glue or like adhesive to the surfaces of the disc 149 and band 143.

Another globe half 159 is then located in place by passing its polar aperture 160 over the polar end 161 of the axis member 140 until the polar part 162 seats upon the disc 148 which has previously received glue or like adhesive. At the same time the equatorial rim 163 of the globe half 159, is slid over the periphery of the band 143 until the rim 163 abuts the rim 156. The previously applied glue or the like to the band 143 will cause the rims 156 and 163 to adhere permanently thereto. A cross pin 164 may then be inserted in the pole part 161 of the axis member 140, adjacent to the polar part 162 of the globe half 159, to hold the same in place. The resultant construction is that shown in Fig. 13.

The surface of the globe may then be covered in any suitable manner by a map, such as by gluing thereon previously printed strips or segments of paper.

When it is desired to mold in certain lines, such as circles, meridians, etc., on the globe, the former may have means whereby the fibrous material may be accreted and integrated to form ridges or grooves as shown in Figs. 14 and 15.

In Fig. 14 is shown a fragment of a former wall 165 provided with apertures 166, ridges 167 and grooves 168. At a predetermined part is formed a recess 169 the surface of which is ridged and grooved. On the ridges 167 rests a thin metal sheet 170 having a large number of apertures 171, and also having in the recess 169, a ribbed part 172 resting against the ridges of the recess, the part 172 also being provided with small apertures.

When the water of the bath is sucked or drawn through the apertures 171 and 166, the fibrous material will be deposited and accreted to form a layer 173 against the inner surface of the sheet 170 as also a part 174 in the channel of the part 172, as clearly shown in Fig. 14. This produces an integral rib 174 or a cameo line in the globe.

Instead of making this line in cameo, it may be made in intaglio or in the form of a groove. The means shown in Fig. 15 is used for that purpose. In this case the former wall 176 is formed with an inwardly projecting part 177 having ridges, grooves, and apertures similar to the ridges 178, grooves 179 and apertures 180 of the remainder of the plate 176. On these ridges rests a thin metal sheet 181 having a channel part 182 fitting the part 177 of the plate 176, the sheet 181 and part 182 being provided with a large number of small apertures 183 and 184.

When the water of the bath is sucked or drawn through the apertures 180, 183 and 184, the fibrous material is accreted and integrated into a layer 185 on the inner surface of the former sheet 181 and with a layer part 186 on the part 182, thus forming a groove or intaglio line in the surface of the blank.

Similarly, the former may be made to mold or accrete the globe material with a contoured surface to represent mountains, rivers, basins, seas and the like, as shown in Fig. 16. In this case the former comprises a former wall 187 having apertures 188, ridges 189, and grooves 190, and on these ridges 189, rests a thin metal sheet 191 having a large number of small holes or apertures 192. It will be noted that the sheet 191 is contoured so that when the water of the bath is sucked or drawn through the apertures 188 and 192 and the grooves 190, the fibrous material is deposited, accreted and integrated in the form of a layer 193 against the sheet 191 and with a contoured surface, as shown in Fig. 16.

While I have herein described and upon the drawings shown an embodiment of the invention, and illustrative means for and method of producing the same, it is to be understood that the invention is not limited thereto but comprehends other constructions, arrangements of parts, details, features, and process steps without departing from the spirit of the invention.

Having thus disclosed the invention,

I claim:

1. A process of making globes of true spheric form, comprising the steps of so accreting, interlacing and integrating suspended fibrous material upon a porous former as to form a hollow hemispherical body while at the same time so agitating said body as to cause an interlacing of the fibres into compact condition, and so compressing the body as to effect the outer surface thereof into true spheric form.

2. A process of making globes of true spheric form, comprising the steps of so accreting, interlacing and integrating suspended fibrous material upon a porous former as to form a hollow hemispherical body while at the same time so agitating said body as to cause an interlacing of the fibres into compact condition, so compressing the body as to effect the outer surface thereof into true spheric form, and so applying heat to said body as to dry and set the fibres of said body whereby its spheric form is maintained.

3. In a device for making globular members, a forming die having a hemispherical porous wall for the accretion and integration thereon of suspended fibrous material, means for effecting a differential of pressure on opposite sides of said wall to cause an accretion and integration of said fibres into a hollow hemispherical body on the side of said wall having the higher pressure, and means so constructed and arranged as to vibrate said wall to cause an interlacing of said fibres.

4. In a device for making globular members, a forming die having a hemispherical porous wall for the accretion and integration thereon of suspended fibrous material, means for effecting a differential of pressure on opposite sides of said wall to cause an accretion and integration of said fibres into a hollow hemispherical body on the side of said wall having the higher pressure, means so constructed and arranged as to vibrate said wall to cause an interlacing of said fibres, and means so constructed and arranged as to compact said body for producing a true spheric form of outer surface of said body.

5. In a device for making globular members, a forming die having a hollow hemispherical forming surface provided with apertures and upon which a body of fibrous material may be accreted and integrated, and a compressing die having a hollow hemispherical compressing surface provided with apertures for compressing said body, the apertures of said compressing die being so arranged and located as to occur in alternation with the projections formed on the surface of said body by the apertures of the forming die so as to iron out said projections.

6. In a device for making globular members, compressing dies having hollow hemispherical compressing surfaces provided with apertures so arranged and located that the apertures of one die are in staggered relation to the apertures of another die whereby the projections formed on the surfaces of said members by the apertures of a die will be ironed out by the smooth surface parts of another die between the apertures thereof.

7. A device for making globular members, comprising a set of female dies including a forming die and compressing dies, a container for a fluid bath of suspended fibres, male compressing dies, a movable support for said container and said male dies, means for moving said support, said means and said support being so constructed and arranged as to bring said container in co-operation with said forming die for the accreting and integrating thereon of a globular member and to bring said male dies in co-operation with said female dies to compress and finish globular members previously accreted and integrated on said forming die and transferred to the compressing dies and being so constructed and arranged as to bring said male dies in co-operation with said female dies for compressing the globular members therebetween and for transferring said members from die to die for successive compressing.

JESSE B. HAWLEY.